April 19, 1932.   L. DE MOSS   1,855,011
GRADING DEVICE
Filed March 11, 1929
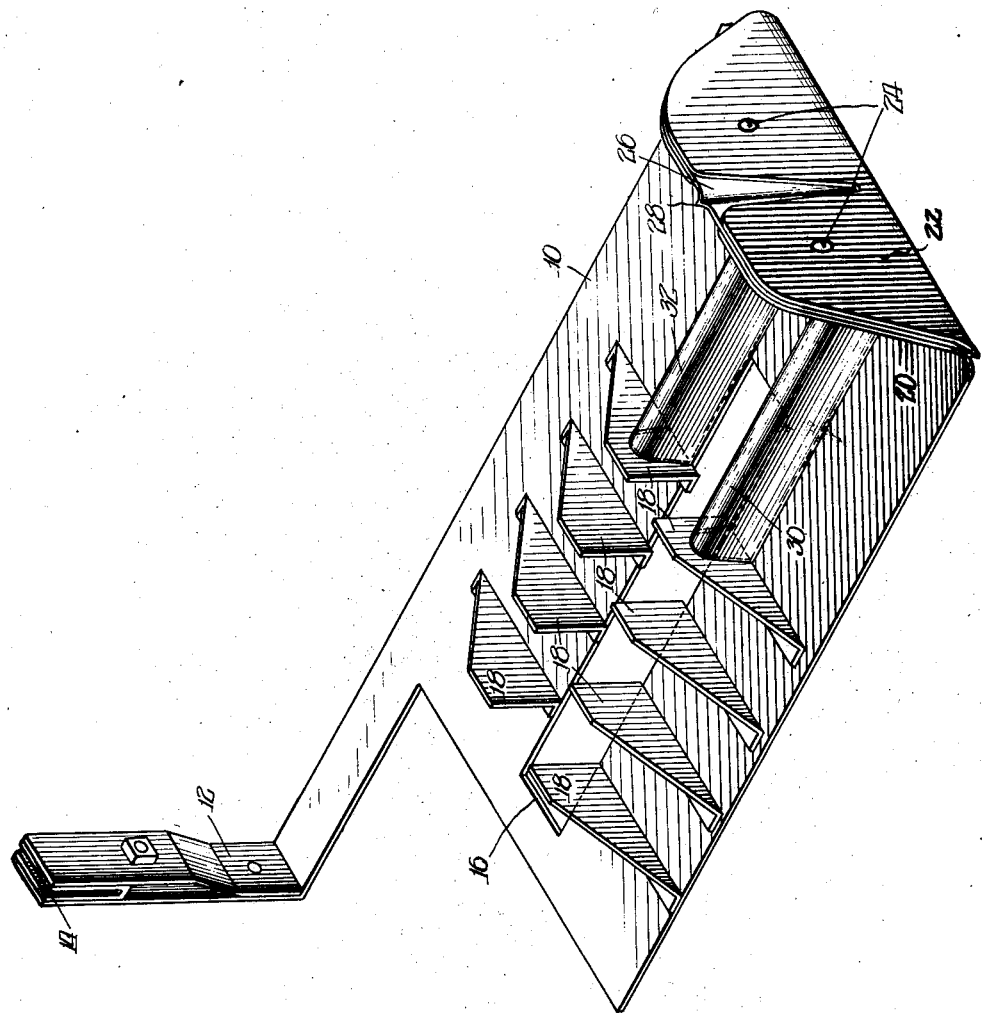
Inventor:
Leonard De Moss,
By Wilkinson, Huxley, Byron & Knight
attys.

Patented Apr. 19, 1932

1,855,011

UNITED STATES PATENT OFFICE

LEONARD DE MOSS, OF DES MOINES, IOWA, ASSIGNOR TO SWIFT AND COMPANY, OF CHICAGO, ILLINOIS, A CORPORATION OF ILLINOIS

GRADING DEVICE

Application filed March 11, 1929. Serial No. 345,959.

This invention relates to grading devices and the like and is illustrated herein as embodied in a device suitable for use in grading hog casings or other similar elongated tubular bodies according to their widthwise dimensions.

It is customary today in grading hog casings in packing plants for each workman to cut in a bar of metal a series of notches corresponding in width to the diameter of the standard grades of casings, and to affix the piece to the side of the work bench. In use, the operator takes a casing from the vat, inflates the casing with water for a distance of perhaps three feet and determines the grade of the casing by fitting it into the notches in the metal bar. The water is passed through the entire casing in this manner, and as the casing varies in diameter the workman severs the casing to separate the grades according to the variations in diameter. By reason of the fact that the notched openings in the metal bar are placed side by side, it is necessary for the workman in grading a casing to insert the casing into each of the notches until an approximate fit is made with the casing, and this trial and error method of grading the casings is tedious and inconvenient.

Accordingly, it is an object of the present invention to provide a novel and improved grading device which will not necessitate the insertion of the casing into a number of isolated notches and will permit casings to be graded with greater speed and accuracy than has heretofore been obtained.

An important feature of the present invention which is conducive to the accomplishment of the recited object consists in the provision of a casing grading device having a plurality of members associated therewith in such a manner as to form a series of alined gauge openings. By means of such a provision the casing can be drawn directly through all of the notches simultaneously, and the workman can determine more easily and accurately into which grade a given portion of the casing falls.

In the use of the grading device, it is contemplated having the casing filled with a suitable fluid in order that its diameter may be easily measured, and in order to prevent the escape of the fluid from the casing. Another important feature of the present invention consists in providing the grading device with means for applying pressure to the outer wall of the casing to bring the inner walls into firm engagement with one another whereby a seal is obtained which prevents the escape of fluid. In the illustrated embodiment of the invention the pressure applying means is disclosed in the form of a resilient gate-way which applies yielding pressure to the outer wall of the casing, the amount of such pressure being sufficient to prevent the escape of fluid through that portion of the casing disposed within the gate-way, but insufficient to interfere with the proper feeding of the casing through the gate-way.

Other objects and features of the invention will become apparent from a reading of the following specification in the light of the accompanying drawings in which there is shown a view in perspective of a grading device constructed in accordance with the present invention.

As illustrated in the drawings, the device comprises a base plate 10 adapted to be mounted upon a work bench, or in any other suitable location, having a knife holder 12 extending upwardly at one extremity thereof, the knife holder being provided with a rubber lining 14. The base plate 10 of the device is cut away longitudinally to provide a central opening, or slot, 16 and adjacent to this slot are mounted a plurality of transversely alined pairs of vertical guides 18, 18; it being observed that the guide members located at the extremity of the board adjacent to the knife holder are more widely separated than the remainder of the guides, and that the balance of the guides are separated from one another successively less and less to form a plurality of alined and graduated openings. Thus, each pair of the transversely alined vertical guides comprises a gauge of a predetermined opening, and all of the gauges taken together form a series of alined openings of successively varying cross-sectional areas.

By means of the provision described in the foregoing paragraph the hog casing being measured may be pulled along through all of the gauge openings simultaneously and may be measured to determine the grade of the casing. This furnishes an extremely simple and efficient form of grading device which may be inexpensively constructed and expediently operated.

It has heretofore been pointed out that in grading casings, it is customary to inflate them by filling them with air, water, or other suitable fluid, and in order to prevent the escape of the fluid lengthwise through the casing as it is being graded the present invention contemplates the employment of a gate-way, illustrated herein in the form of an upwardly extending and slightly inclined end 20 formed integrally with the base plate 10 and a cooperating plate member 22 adapted to be secured to the end by means of suitable fastenings 24. Both the end member 20 and the cooperating plate 22 are formed with centrally arranged V-shaped openings, or gate-ways, indicated generally by the reference numeral 26, which are adapted to be brought into registration with one another when the two parts are properly assembled.

In the use of the grading device the hog casing is fed first through the V-shaped opening and thence across the grading board, and to the end of preventing escape of the fluid from the casing there is provided a gate, or valve, composed of a thin sheet, or a plurality of sheets, of rubber interposed between the upwardly extending end 20 of the base plate 10 and the cooperating plate 22. The rubber sheet is split heightwise in a line bisecting the V-shaped opening 26 to form a closure for the latter named opening. As illustrated, the rubber gate-way is formed in such a manner that the edges thereof located at the top of the V-shaped opening 26 project slightly past one another and abut to form a joint 28.

Thus, in use, as the casing is fed through the V-shaped opening, the rubber gate grasps the casing and holds its opposite sides firmly against one another to prevent the rearward passage of the water through the gate, but the pressure thus applied is insufficient to interfere with the feeding of the casing across the grading device. Hence, from so much of the description as has already been given, it will be understood that the casing may be fed through the gate-way and across the grading board between the guides or gauges 18 without permitting the rearward escape of water from the casing, whereby an accurate mode of measurement is provided.

As illustrated herein, the grading device is provided with a plurality of guide ways 30, 32 leading from opposite sides of the gateway 26 to the nearest members 18, 18, and as shown in the drawings, the guideways comprise inverted U-shaped troughs.

Although the invention has been illustrated herein as embodied in a particular form of grading device having particular guide gate-ways, gauges and the like of certain forms, it is to be appreciated that variation and modifications may be made in the invented design from time to time without departing from the true scope of the invention as set forth in the appended claims, and it is also to be understood that although the invention has been described herein with particular reference to measuring hog casings, the invention contemplates employment in measuring other similar elongated tubular bodies or material.

Having thus described my invention, what I claim as new and desire to secure by United States Letters Patent, is:

1. A hog casing grading device comprising, in combination, a base plate, and a plurality of vertically extending members grouped in pairs and mounted on said base plate, in such a manner that the members of each pair are separated from one another to form a gauge opening, and the members of the various pairs are separated from one another by different distances to form a series of gauge openings of different sizes and means associated therewith for guiding hog casings through said openings comprising cooperating opposed members providing a feeding slit disposed in alignment with said gauge openings.

2. A hog casing grading device, comprising, in combination, an approximately rectangular base plate, a plurality of vertically extending members arranged along the longitudinal center line of the base plate, said members being grouped in pairs with the members in each pair spaced apart and transversely alined with respect to the longitudinal center line, the spaces between the successive aligned members being of gradually changing area, whereby there is provided base plate having a series of gauge openings of graduated size, and means associated therewith for guiding hog casings through said openings, comprising cooperating opposed members providing a feeding slit disposed in alignment with said gauge openings.

3. A device for use in grading a fluid filled hog casing, comprising, in combination, a gauging portion, and means associated therewith for pressing the opposite inner side walls of the casing firmly against one another while passing therethrough to prevent the escape of the fluid from the casing, said means being located in the path of feed of said casing to said gauging portion and at the entering end thereof.

4. A device for use in grading a fluid filled hog casing, comprising, in combination, gauging portion, and resilient means associated therewith for pressing the opposite inner side walls of the casing firmly against one another while passing therethrough to prevent the escape of the fluid from the casing, said means being located in the path of feed of said casing to said gauging portion and at the entering end thereof.

5. A device for use in grading a fluid filled hog casing, comprising, in combination, a gauging portion, and a resilient gateway comprising a plurality of rubber edges arranged to abut one another and to engage the outer wall of the fluid filled casing to deform the casing and prevent the escape of fluid therefrom.

6. A device for use in grading a fluid filled hog casing, comprising, in combination, a gauging portion, casing contacting means located in the path of feed of the casing to said gauging portion for applying pressure to the casing wall to prevent the escape of fluid therefrom, and means for guiding the casing from the pressure applying means to the gauging portion of the grading device.

7. A device for use in grading a fluid filled hog casing, comprising, in combination, a plurality of vertically extending members so arranged as to present a series of alined graduated gauge openings, and a resilient gateway associated therewith and adapted to prevent the escape of fluid from the casing during the gauging operation, said gateway being located in the path of feed of said casings to said gauging portion and at the entering end thereof.

Signed at Des Moines, Iowa, this 1st day of March, 1929.

LEONARD DE MOSS.